US012706811B2

(12) United States Patent
Naik et al.

(10) Patent No.: US 12,706,811 B2
(45) Date of Patent: Aug. 11, 2026

(54) SYSTEM AND METHOD FOR IMPLEMENTING RAN TELEMETRY FRAMEWORK IN A MOBILE NETWORK

(71) Applicant: TEJAS NETWORKS LIMITED, Bengaluru (IN)

(72) Inventors: Parag Naik, Bengaluru (IN); Anindya Saha, Bengaluru (IN); Makarand Kulkarni, Bengaluru (IN); Susmit Datta, Bengaluru (IN); Sebastian Gracias, Bengaluru (IN)

(73) Assignee: TEJAS NETWORKS LIMITED, Bengaluru (IN)

( * ) Notice: Subject to any disclaimer, the term of this patent is extended or adjusted under 35 U.S.C. 154(b) by 0 days.

(21) Appl. No.: 18/534,816

(22) Filed: Dec. 11, 2023

(65) Prior Publication Data

US 2024/0205098 A1 Jun. 20, 2024

(30) Foreign Application Priority Data

Dec. 16, 2022 (IN) ............................ 202241073037

(51) Int. Cl.
*H04L 41/142* (2022.01)
*H04L 41/0659* (2022.01)

(52) U.S. Cl.
CPC ........ *H04L 41/142* (2013.01); *H04L 41/0659* (2013.01)

(58) Field of Classification Search
CPC .......................... H04L 41/142; H04L 41/0659
See application file for complete search history.

(56) References Cited

U.S. PATENT DOCUMENTS 11,507,430 B2 * 11/2022 Subramanian ........... G06N 3/04
2019/0068464 A1 * 2/2019 Bernat ...................... G06F 1/20
2020/0167258 A1 * 5/2020 Chattopadhyay ..... G06F 9/5088
(Continued)

OTHER PUBLICATIONS

Li et al, "6G Cloud-Native System: Vision, Challenges, Architecture Framework and Enabling Technologies", IEEE Access, vol. 10, Jan. 1, 2022.*

(Continued)

*Primary Examiner* — Todd L Barker
(74) *Attorney, Agent, or Firm* — HSML P.C.

(57) ABSTRACT

Various embodiments related to a system and method for implementing a RAN telemetry framework in a mobile network, are described. The system and method may include a telemetry collection and processing (TCP) engine that may execute operations to establish communication between the TCP engine and an accelerator device. The TCP engine may be deployed on the CPU core of a server. Further, the system and method include receiving a message from the one or more accelerator device based on the established communication. The message includes one or more telemetry statistical information. Further, the system and method include executing one or more operation based on the received message. The one or more operation includes configuring one or more computing resource on the one or more accelerator device, reconfiguring one or more computing resource on the one or more accelerator device, periodically assimilating statistical information, and a telemetry operation.

16 Claims, 10 Drawing Sheets

(56) References Cited

U.S. PATENT DOCUMENTS

| | | | | |
|---|---|---|---|---|
| 2022/0197615 | A1* | 6/2022 | Kinsner | G06F 8/433 |
| 2024/0259879 | A1* | 8/2024 | Ranganath | H04L 41/5054 |

OTHER PUBLICATIONS

Carbone et al., "NeuroRAN: Rethinking Virtualization for AI-native Radio Acess Networks in 6G", Apr. 15, 2021.*

Ojanpera et al., "Application Synchronization Among Multiple MEC Servers in Connected Vehicle Scenarios", Aug. 2018, IEEE Publishing.*

* cited by examiner

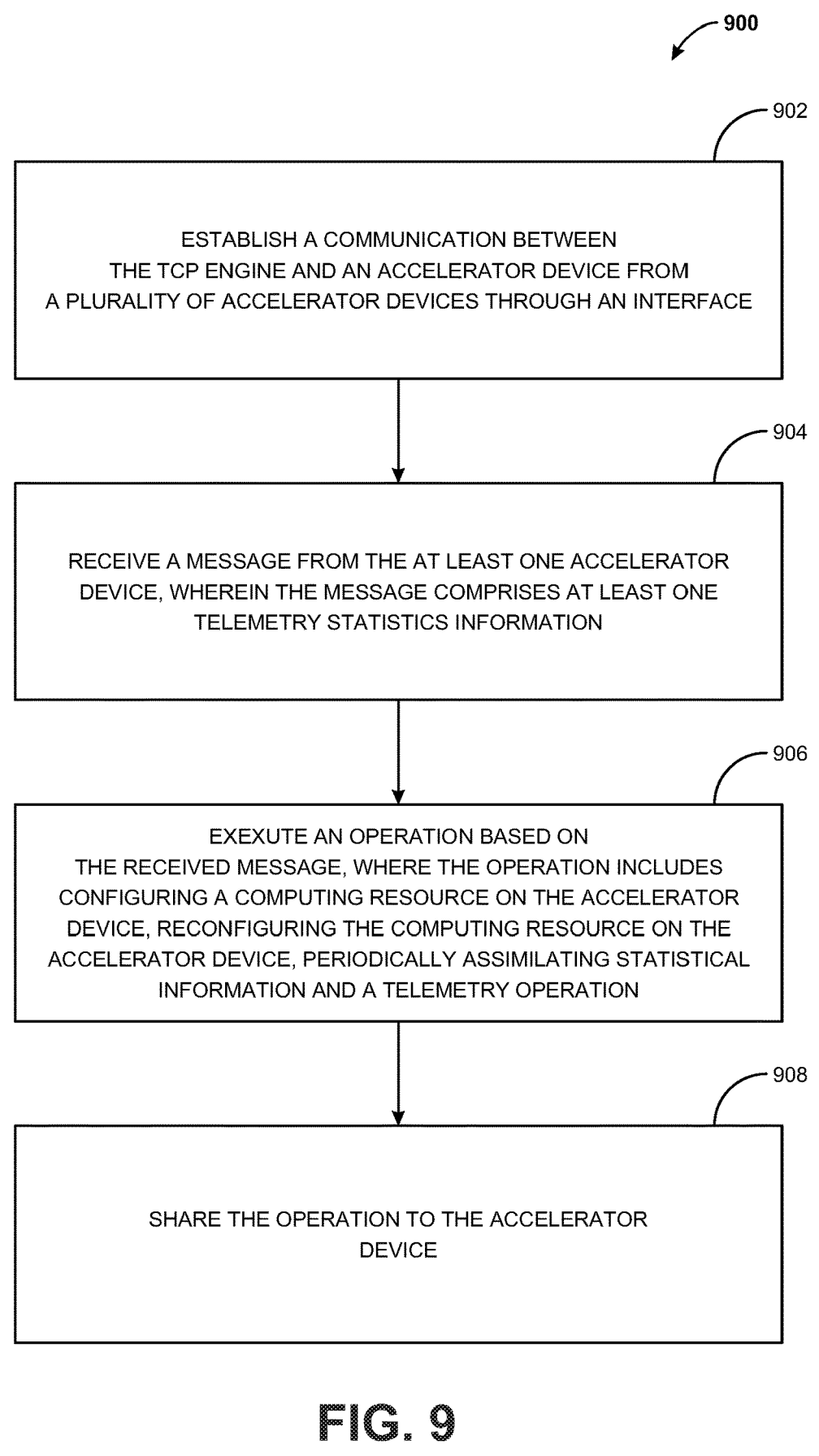

900

902

ESTABLISH A COMMUNICATION BETWEEN THE TCP ENGINE AND AN ACCELERATOR DEVICE FROM A PLURALITY OF ACCELERATOR DEVICES THROUGH AN INTERFACE

904

RECEIVE A MESSAGE FROM THE AT LEAST ONE ACCELERATOR DEVICE, WHEREIN THE MESSAGE COMPRISES AT LEAST ONE TELEMETRY STATISTICS INFORMATION

906

EXEXUTE AN OPERATION BASED ON THE RECEIVED MESSAGE, WHERE THE OPERATION INCLUDES CONFIGURING A COMPUTING RESOURCE ON THE ACCELERATOR DEVICE, RECONFIGURING THE COMPUTING RESOURCE ON THE ACCELERATOR DEVICE, PERIODICALLY ASSIMILATING STATISTICAL INFORMATION AND A TELEMETRY OPERATION

908

SHARE THE OPERATION TO THE ACCELERATOR DEVICE

FIG. 9

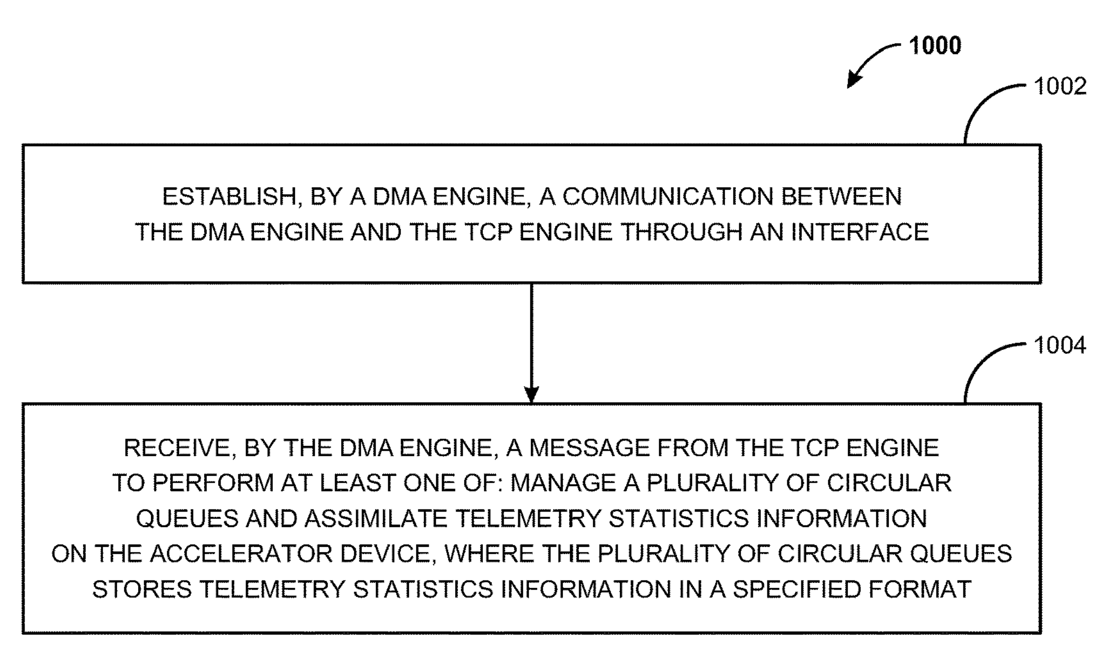

ESTABLISH, BY A SME, A COMMUNICATION BETWEEN THE SME AND THE TCP ENGINE THROUGH THE INTERFACE

1104

RECEIVE, BY THE SME, A MESSAGE FROM THE TCP ENGINE

1106

TRIGGER, BY THE SME, ONE OR MORE OPERATION BASED ON THE RECEIVED MESSAGE, WHERE THE ONE OR MORE OPERATION INCLUDES AT LEAST ONE OF: COLLECTING STATISTICS INFORMATION, ASSIMILATING STATISTICS INFORMATION, EXCHANGING THE STATISTICS INFORMATION WITH A HOST DEVICE WHILE THE HOST DEVICE POWERS ON, MANAGING AND ALLOCATING A TLV VALUE FOR THE COLLECTED STATISTICS INFORMATION, EXECUTING OPERATIONS RELATED TO A RUNTIME ACTION, A USER DRIVEN TRIGGER TO COLLECT THE TELEMETRY INFORMATION IN AN INSTRUMENTATION ENGINE, AND OPERATING WITH A DATA DRIVEN MODULE FOR OPTIMIZING A SETTING UP OF THE AT LEAST ONE COMPUTING RESOURCE BASED ON AT LEAST ONE PARAMETER

FIG. 11

SYSTEM AND METHOD FOR IMPLEMENTING RAN TELEMETRY FRAMEWORK IN A MOBILE NETWORK

CROSS-REFERENCE

This application claims priority to an Indian Patent Application No. 202241073037 filed on Dec. 16, 2022, and the entire content disclosed by the Indian patent application is incorporated herein by reference as part of the present application for all purposes under U.S. law.

FIELD

The present disclosure relates to implementing a system and method in a wireless communication system, and, more particularly, it relates to a method and a system for implementing operations or functions of a radio access network (RAN) telemetry framework in a mobile network.

BACKGROUND

In a Virtualized RAN (vRAN) application that includes a data center setup, various types of statistical information or statistical data may be collected from computing resources, for example, accelerator devices. The different types of statistical information or statistical data may be referred to as RAN telemetry data. Such data or information may be collected from various accelerator devices at a server and a data center level and may optimize the utility of resources and network performance in a mobile network. However, traditional systems have limited capabilities for collecting statistical data at a deeper level with reference to accelerator devices. Further, the accelerator devices may be manufactured by different vendors, which may include different mechanisms and enable the collection of statistical data based on these mechanisms.

Further, the accelerator devices may be interfaced through standard protocols, for example, peripheral component interconnect express (PCIe) bus or the like. The statistical information or data collection mechanisms may differ from vendor to vendor and product to product. Therefore, in the absence of a standardized mechanism, collecting statistical data or information from multiple accelerator devices and processing information or data may be challenging. Therefore, there is a need for a system and method that enables the collection of statistical data efficiently and in a synchronized manner from multiple components in the data center.

The limitations and disadvantages of conventional approaches will become apparent to one of skill in the art through the comparison of described systems with some aspects of the present disclosure, as set forth in the remainder of the present application and with reference to the drawings.

SUMMARY

A system and method are provided for implementing a radio access network (RAN) telemetry framework in a mobile network. For example, the mobile network may correspond to a fifth-generation (5G) mobile network, an Open Radio Access Network (O-RAN), a sixth-generation (6G) network, or the like. In one aspect, the system, and method include implementing an execution of multiple operations or functions by a telemetry collection and processing (TCP) engine. For instance, the TCP engine may execute operations to establish communication between the TCP engine and an accelerator device from multiple accelerator devices in a data center through an interface (e.g., PCIe interface or the like). The TCP engine may be deployed on the CPU core of a server. Further, a message may be received from the accelerator device by the TCP engine. The message may include telemetry statistical information. Further, the system and method may include executing one or more operations based on the received message by the TCP engine. The one or more operation includes one or more of: configuring one or more computing resource on the accelerator device, reconfiguring one or more computing resource on the accelerator device, periodically assimilating statistical information, and executing functions related to a telemetry operation. Further, the system and method include sharing one or more operations with the accelerator device by the TCP engine.

In an embodiment, one or more telemetry statistical information includes one or more of: capability and identification information, a reconfiguration message exchanged between a host device and one or more accelerator devices at runtime, an error message exchanged between the host device and the one or more accelerator device at runtime, and a reconfiguration message indicating re-configuring queues and a hardware function.

In an embodiment, the one or more computing resource corresponds to one or more of the: allocate a Type-Length-Value (TLV) value for each statistic type associated with the one or more telemetry statistical information, a required number of telemetry statistics queues, a desired measurement, statistics collection periodicity, and an amount of queue memory available and mapping of the TLV to the queue. The measurements may include, for example, a Synchronization Signal-Reference Signal Received Power (SS-RSRP), a Channel State Information Reference Signal Received Power (CSI-RSRP), a Synchronization Signal Reference Signal Received Quality (SS-RSRQ), a Channel State Information Reference Signal Received Quality (CSI-RSRQ), a Synchronization Signal Signal-To-Interference-Plus-Noise Ratio (SS-SINR) and a Channel State Information Signal-To-Interference-Plus-Noise Ratio (CSI-SINR).

In an embodiment, the one or more accelerator device comprises a dynamic memory access (DMA) engine and a statistics management entity (SME), where the one or more accelerator device provides the one or more telemetry statistical information when a host device acts as a consumer. The DMA engine may be communicatively coupled with a queue management engine. The queue management engine may execute operations to determine the maximum number of statistical queues that may be supported at the one or more accelerator device and information on the amount of memory available in one or more accelerator device to store the one or more telemetry statistical data or statistical information.

In an embodiment, the one or more accelerator device sends periodic timekeeping messages through a timekeeping queue to the TCP engine when the host device does not have periodicity support.

In an embodiment, the one or more accelerator device shares an execution capability detail comprising one or more parameter with a host device. The one or more parameter includes a list of statistic types supported by the one or more accelerator device, a type of vendor, a maximum periodicity supported for each statistic type associated with the one or more telemetry statistical information, the maximum number of statistics queues supported at the one or more accelerator device, information regarding an amount of memory available in the one or more accelerator device to store the one or more telemetry statistical information.

In an embodiment, the RAN telemetry framework may execute operations, for example, for managing different types of the one or more telemetry statistical information, managing the periodicity of a collection process of the one or more telemetry statistical information, and periodicity control of the one or more telemetry statistical information.

In an embodiment, the system, and method may provide execution of operations for implementing the RAN telemetry framework in the mobile network. The system and method include establishing, by a DMA engine included in one or more accelerator devices from a plurality of accelerator devices, communication between the DMA engine and a TCP engine through an interface. The TCP engine is deployed on a CPU core associated with a server. Further, the method includes receiving a message from the TCP engine by the DMA engine to execute one or more of: manage a plurality of circular queues and assimilate telemetry statistical information on one or more accelerator devices. The plurality of circular queues stores telemetry statistical information in a specified format (or predefined format). For example, the specified format (predefined format) may include a free format and a Type-Length-Value (TLV) format.

In an embodiment, the telemetry statistical information is collected in the free format when a vendor identifier (ID) is implicit, and the host device recognizes one or more accelerator devices. The distinct types of telemetry statistical information are collected and segregated by mapping different streams to a corresponding queue managed by the DMA engine.

In an embodiment, the TLV format may capture critical information related to the telemetry statistical information. The TLV format includes, for example, one or more types of fields, a length field, a stream ID field, a timestamp field, and a value field. The type of field identifies a type of telemetry statistical information present in a data packet. The length field indicates the length of the data packet and a packet boundary. The stream ID field corresponds to a specific statistic type collected from multiple points in a network processing chain. The timestamp field indicates a telemetry sample carried in a payload, and the value field indicates actual telemetry statistical information.

In an embodiment, the system, and method for implementing the RAN telemetry network may include establishing communication between the SME and a TCP engine through an interface by an SME. The TCP engine is deployed on a CPU core associated with a server. Further, the method includes receiving a message from the TCP engine by the SME. Further, the method includes instantiating one or more operations based on the received message by the SME. The one or more operation includes one or more of: collecting statistical information, assimilating statistical information, exchanging the statistical information with a host device while the host device powers ON, managing and allocating a TLV value for the collected statistical information, executing operations related to a runtime action, a user-driven instantiation to collect the telemetry information in an instrumentation engine, and operate with a data-driven module (e.g., machine learning module, artificial intelligence module or the like) for optimizing a setting up of the one or more computing resource based on one or more parameter.

In an embodiment, the runtime action includes one or more of: re-initialize a statistics collection mechanism that is initiated by the host device, reconfiguration message exchanged between the host device and the one or more accelerator device at runtime, an error message exchanged between the host device and the one or more accelerator device at runtime, where one or more parameter includes a time of the day, traffic pattern, and quality of service (QoS).

In an embodiment, the instrumentation engine sends the telemetry information to the DMA engine.

In an embodiment, the TCP engine includes a RAN telemetry framework controller coupled with a processor and memory. The RAN telemetry framework controller is configured to establish communication between the TCP engine and one or more accelerator devices from a plurality of accelerator devices through an interface. The TCP engine is deployed on the CPU core of a server. Further, the RAN telemetry framework controller is configured to receive a message from one or more accelerator devices. The message includes one or more telemetry statistical information. Further, the RAN telemetry framework controller is configured to execute one or more operations based on the received message. The one or more operations includes one or more of: configuring one or more computing resources on one or more accelerator devices, reconfiguring one or more computing resources on one or more accelerator devices, periodically assimilating statistical information, and a telemetry operation. The telemetry operation may be referred to as measuring, for example, an SS-RSRP, a CSI-RSRP, an SS-RSRQ, a CSI-RSRQ, an SS-SINR, and a CSI-SINR. Further, the RAN telemetry framework controller is configured to share one or more operations with the one or more accelerator devices.

In an embodiment, a DMA engine of a RAN telemetry framework is provided in the mobile network. The DMA engine includes a RAN telemetry framework controller coupled with a processor and memory. The RAN telemetry framework controller is configured to establish communication between the DMA engine and a TCP engine via an interface. The TCP engine is deployed on a CPU core associated with a server. The DMA engine is included in one or more accelerator devices from a plurality of accelerator devices. Further, the RAN telemetry framework controller is configured to receive a message from the TCP engine to execute one or more of: manage a plurality of circular queues and assimilate telemetry statistical information on one or more accelerator devices. The plurality of circular queues stores telemetry statistical information in a specified format (or the predefined format).

In an embodiment, an SME is provided for handling the operation of a RAN telemetry framework in a mobile network. The SME includes a RAN telemetry framework controller coupled with a processor and memory. The RAN telemetry framework controller is configured to establish communication between the SME and a TCP engine through an interface. The TCP engine is deployed on a CPU core associated with a server. The SME is included in one or more accelerator devices from a plurality of accelerator devices. Further, the RAN telemetry framework controller is configured to receive a message from the TCP engine. Further, the RAN telemetry framework controller is configured to instantiate one or more operation based on the received message, wherein one or more operation comprises one or more of: collecting statistical information, assimilating statistical information, and exchanging the statistical information with a host device while the host device powers on, manage and allocate a TLV value for the collected statistical information, execute operations related to a runtime action, a user-driven instantiation to collect the telemetry information in an instrumentation engine, and operating with a data-driven module for optimizing a setting up of the one or more computing resource based on one or more parameter.

These and other features and advantages of the present disclosure may be appreciated from a review of the following detailed description of the present disclosure, along with the accompanying figures in which reference numerals refer to like parts throughout.

BRIEF DESCRIPTION OF THE DRAWINGS

Various embodiments will be better understood from the following description with reference to the drawings in which.

FIG. 9 is a flow chart illustrating a method implemented by the TCP engine of a RAN telemetry framework in a mobile network, according to an exemplary embodiment.

FIG. 10 is a flow chart illustrating a method implemented by the DMA engine of the RAN telemetry framework in the mobile network, according to an exemplary embodiment.

FIG. 11 is a flow chart illustrating a method implemented by the SME of the RAN telemetry framework in the mobile network, according to an exemplary embodiment.

DETAILED DESCRIPTION

Figure 1:
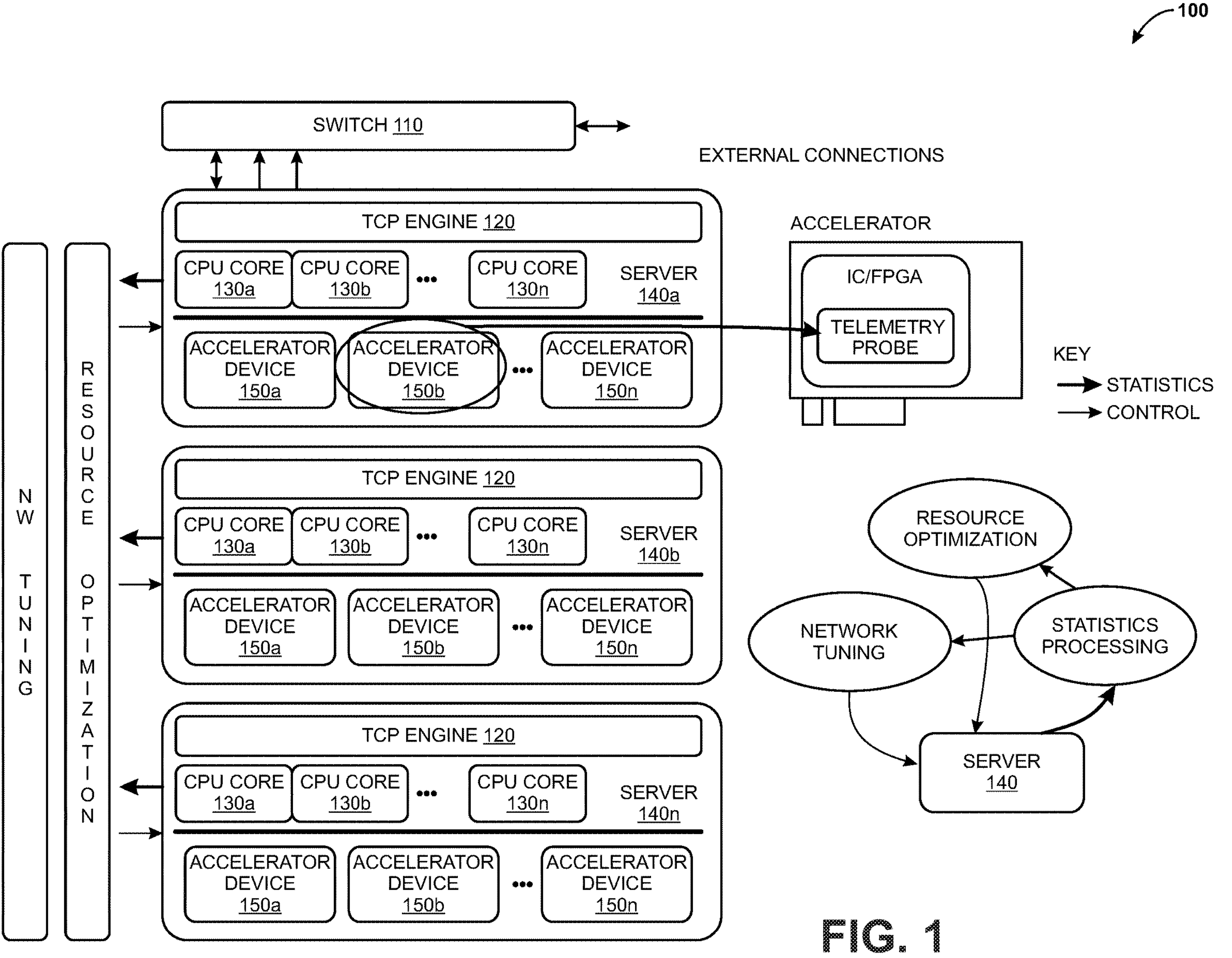
FIG. 1 shows an illustration of a data center setup, according to an exemplary embodiment.

These and other aspects of various embodiments herein will be better appreciated and understood when considered in conjunction with the following description and the accompanying drawings. It should be understood, however, that the following descriptions, while indicating various embodiments and numerous specific details thereof, are given by way of illustration and not of limitation. Many changes and modifications may be made within the scope of the various embodiments herein without departing from the spirit thereof, and the various embodiments herein and the appended claims include all such modifications.

The embodiments disclosed herein are illustrated in the accompanying drawings, throughout which reference letters indicate corresponding parts in the various figures. As used in this specification, the phrase "one or more of A, B, and C" includes within its scope "only A," "only B," "only C," "both A and B," "both B and C," "both A and C," and "all of A, B, and C.

The embodiments described in the subject specification and the various features and advantageous details are explained more fully concerning the non-limiting embodiments illustrated in the accompanying drawings and detailed in the following description. Descriptions of well-known components and processing techniques are omitted so as to not unnecessarily obscure the embodiments herein. The examples used herein are intended merely to facilitate an understanding of how the embodiments herein may be practiced and enable those of skill in the art further to practice the embodiments herein. Accordingly, the examples should not be construed as limiting the scope of the embodiments herein.

In an implementation, the terms software components or components, software routines or routines, software models or models, software engines or engines, software scripts or scripts, and layers are used interchangeably throughout the subject specification, unless context warrants distinction(s) amongst the terms based on implementation. The implementation primarily involves executing computer-readable code, such as a sequence of instructions, by a processor of a computing device (e.g., a special-purpose computer, a general-purpose computer, or a mobile device) in an integrated environment. The computing device may be configured to execute operations of the special-purpose computer when the processor executes the instructions stored in the memory of the computing device. The execution of specific operations enables the computing device to execute operations as the special purpose computer, thereby improving the technical operation of the special purpose computer. The execution of specific operations, either individually or in cooperation, may collectively provision a platform, a framework, or an architecture that implements functions or operations of RAN as microservices. The above models, software components, and software routines may be reused based on the definition and implementation.

In an embodiment, a system, and method for implementing a RAN telemetry framework in a mobile network are provided. The system and method include implementing an execution of a telemetry communication and processing (TCP) engine. For instance, the TCP engine may be configured to execute operations of establishing communication between the TCP engine and one or more accelerator devices from a plurality of accelerator devices through an interface. The TCP engine is deployed on the CPU core of a server. Further, the method includes receiving a message from one or more accelerator devices by the TCP engine. The message includes one or more telemetry statistical information. Further, the method includes executing one or more operations based on the received message by the TCP engine. The one or more operations include one or more of: configuring one or more computing resources on one or more accelerator devices, reconfiguring one or more computing resources on one or more accelerator devices, periodically assimilating statistical information, and a telemetry operation. Further, the method includes sharing, by the TCP engine, the one or more operations to the one or more accelerator devices.

Unlike conventional methods and systems, the system, and method described may enable the collection or assimilation of distinct types of statistical information from multiple accelerator devices that multiple vendors may manufacture. The system and method described may define mechanisms to manage periodic data collection. For example, all statistical information or statistical data that have been described previously may be periodically collected. The system and method described may provide flexibility to the server in determining the statistics consumption pattern and managing intermediate queues.

In an embodiment, the system and method described may collect distinct types of statistical information or statistical data from different accelerator devices. The method described may define functions or operations that the accelerator device and the server components may execute. The method described may define the packet format to manage statistical data from different vendors and types. The method described may determine enabling specific statistical information or statistical data. For example, the statistical information or statistical data monitored may include, for example, the CSI-SINR. The CSI-SINR may be used for connected mode mobility procedures. The CSI-SINR may represent a ratio of the signal power to the interference plus noise power. Both the signal power and the interference plus noise power are measured from resource elements (Res) used by the CSI-RS. Hence, knowing the statistics of CSI SIN may enable predicting the changes or modifications in the mobility characteristics for a given set of UEs. The method described may determine the periodicity of reading the statistical information. This may be different for different statistic types. The method described may provide flexibility in managing intermediate storage for the collected data.

Based on the method described, the RAN telemetry framework facilitates vendors' adoption of standard interfaces and features, thereby accommodating multiple vendors and statistic information types. The RAN telemetry framework enables the use of the TLV statistics type while transferring actual statistical information. The RAN telemetry framework provides flexibility so that the telemetry collection function may configure queues, etc., that may enable the collection and management of different statistical information types with various periodicity and data sizes. Further, the RAN telemetry framework may provide a flexible queue configuration approach to manage different types of statistics, a mechanism to manage the periodicity of the statistics collection process and periodicity control.

Referring now to the drawings, and more particularly to FIGS. 1 through 12, where the same reference characters denote corresponding features consistently throughout the figures, their various embodiments are shown.

FIG. 1 shows an illustration of a data center setup 100, according to an exemplary embodiment. In an embodiment, the data center setup 100 includes a switch 110 and one or more server(s) 140*a*-140*n*, where each of the one or more server(s) 140*a*-140*n* may be considered as including a combination of several central processing unit (CPU) cores 130*a*-130*n*, and accelerator cards (or accelerator devices or ASICs/FPGA devices) (50*a*-150*n*. Hereafter, the CPU core(s) may be referenced with a reference numeral 130, and the accelerator card(s) may be referenced by the reference numeral 150. The terms "accelerator device," "accelerator card," "application-specific integrated circuit (ASIC) device," and "Field Programmable Gate Array (FPGA) device" may be used interchangeably in the subject specification. The switch 110 is coupled with the server(s) 140*a*-140*n*. The server(s) 140*a*-140*n* may be, for example, but not limited to, an edge server, a cloud server, or the like. For example, many of the components of Virtualized RAN (vRAN) systems are realized in the data center setup (100) using a mixture of the server(s) 140*a*-140*n* and the accelerator device(s) 150.

In an embodiment, primary objectives of data center usage may include maximizing the utility of the CPU and other computing resources, such as accelerators, optimizing or tuning application parameters (e.g., RAN processing chains) to reduce a load, and achieving optimum performance, and fine-tuning the accelerator device 150 for optimal power consumption, etc.

In an embodiment, the acceleration functions are typically implemented using FPGAs or custom ASICs. To optimize usage, various runtime statistics related to the accelerator functions (e.g., RAN network functions or the like) may be helpful in the following ways.

1. Measurements such as an ongoing hardware utilization level may help improve resource usage.
2. Various application-specific parameters collected runtime may help improve operational efficiency.
3. In field programmable devices, adding "new" functions, operations, or devices on demand for better performance and power.

For example, multiple radio-related measurements may be collected from the RAN processing chain to improve network performance and optimize resource utility. Such resource optimization reduces operational costs and minimizes the total cost of ownership for a Mobile Network Operator (MNO).

Figure 2:
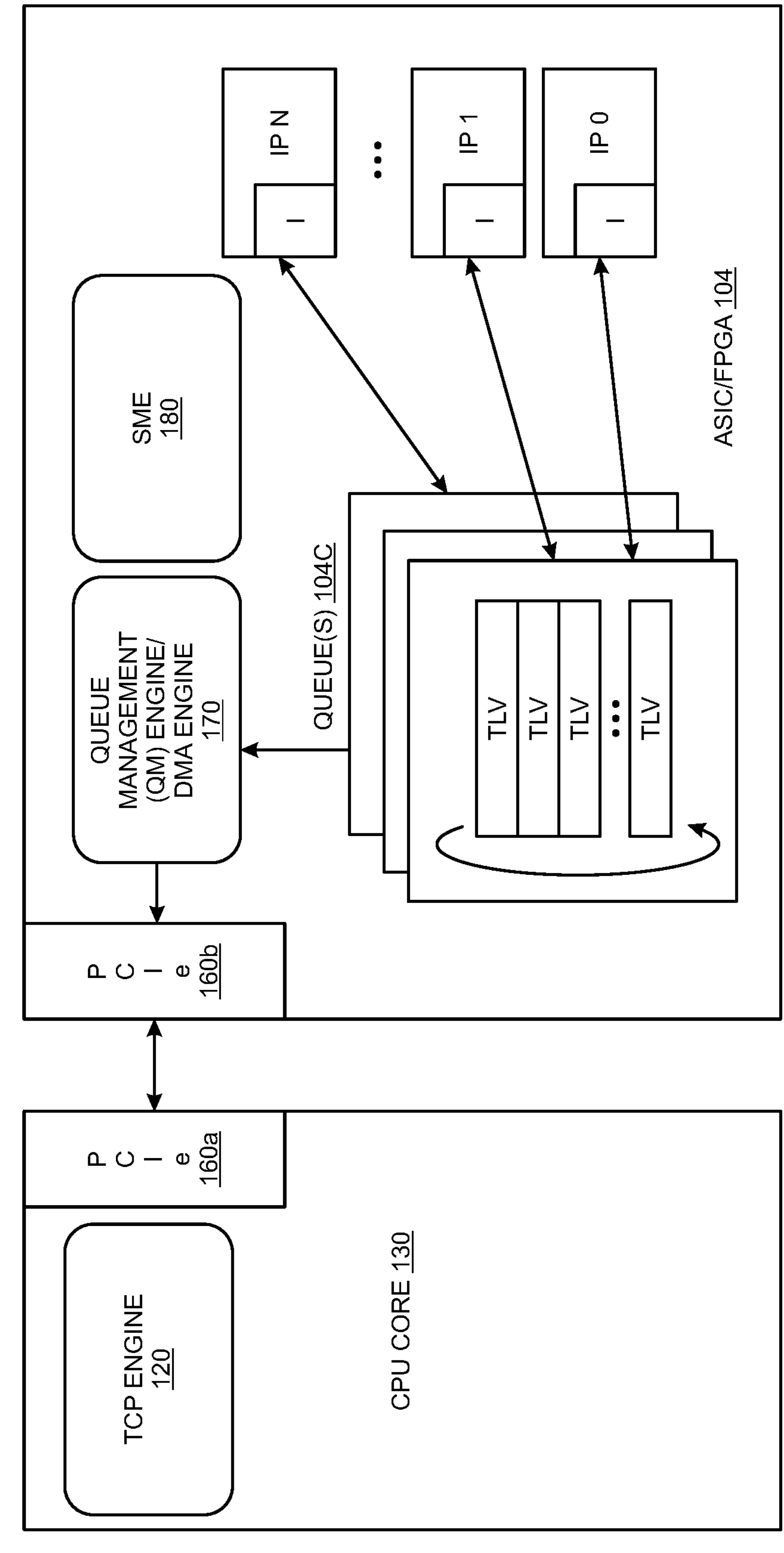
FIG. 2 is a block diagram illustrating a RAN telemetry framework processing environment at the data center setup, according to an exemplary embodiment.

FIG. 2 is a block diagram illustrating a RAN telemetry framework processing environment (200) at the data center setup (100), according to an exemplary embodiment. FIG. 2 is described in conjunction with FIG. 1. In an embodiment, a general operation, and arrangement of the data center setup 100 is described with reference to FIG. 1. The RAN telemetry framework processing environment (200) may be implemented, for example, in a 5G mobile network, an Open Radio Access Network (O-RAN), a sixth-generation (6G) network, or the like. Referring to FIG. 2, the RAN telemetry framework processing environment (200) includes components, engines, or modules of a RAN telemetry framework that may execute operations or function either independently or in cooperation. The RAN telemetry framework processing environment 200 may include, for example, a telemetry collection, and processing (TCP) engine 120 that may be deployed on a CPU core 130 on a server 140. The RAN telemetry framework processing environment 200 may further include a pool or collection of computing resources that may accelerate the execution of operations or functions and thus function as an accelerator device 150. For example, the computing resources are included in the accelerator device 150 (e.g., ASIC/FPGA device or the like) that may be configured to accelerate the execution of certain operations or functions. In an embodiment, the accelerator device 150 may communicate with the TCP engine 120 via a PCIe bus (or PCIe interface) 160*a* and 160*b*.

In an embodiment, the TCP engine 120 may be deployed on one of the CPU cores 130, for example, on the server 140. The TCP engine 120 may be configured to execute functions or operations that may include, for example, multiple telemetry functions, configuring or reconfiguring accelerators (e.g., computing resources), and periodically assimilating statistical data or information.

Figure 5:
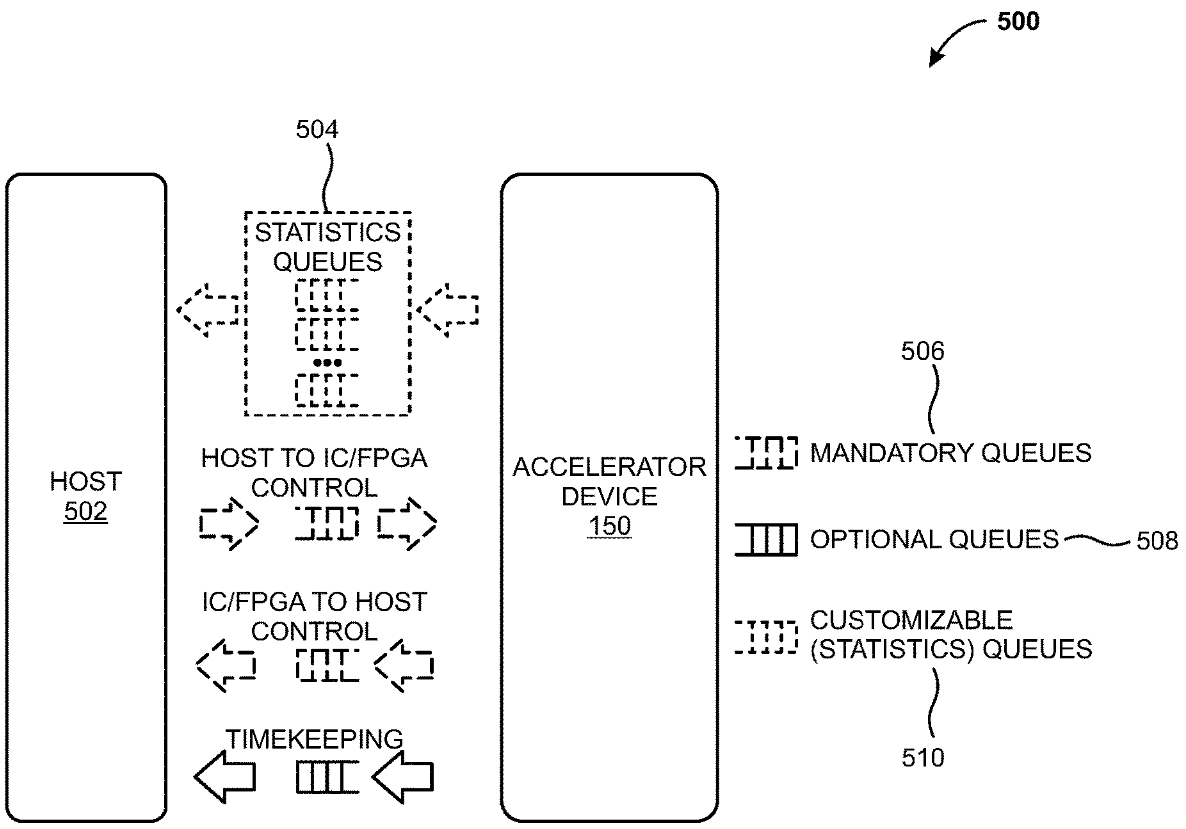
FIG. 5 is a block diagram illustrating an example implementation of different queue categories, according to an exemplary embodiment.

In an embodiment, the accelerator device 150 may further include a dynamic memory access (DMA) engine 170 (or queue management engine). The DMA engine 170 may execute functions or operations to manage circular queues, such as temporarily storing the telemetry statistical data. In an embodiment, a host device 502 (as shown in FIG. 5) and the DMA engine 170 may interface with the queue management engine through the standard PCIe interface 160*a* and 160*b* on the host device 502. The host device 502 may be, for example, but not limited to a smartphone, a laptop, an Internet of Things (IoT) device, or the like. The DMA engine 170 may interface with multiple other components or modules or the engine that may assimilate telemetry data on the host device 150. The queue management engine, for example, may store information or data in a free format or TLV (Type/Length/Value) format. In an embodiment, the DMA engine 170 may be communicatively coupled with the queue management engine. The queue management engine may determine the maximum number of statistical queues that may be supported at the accelerator device 150 and information regarding the amount of memory available in the accelerator device 150 to store the telemetry statistical information.

Figure 3:
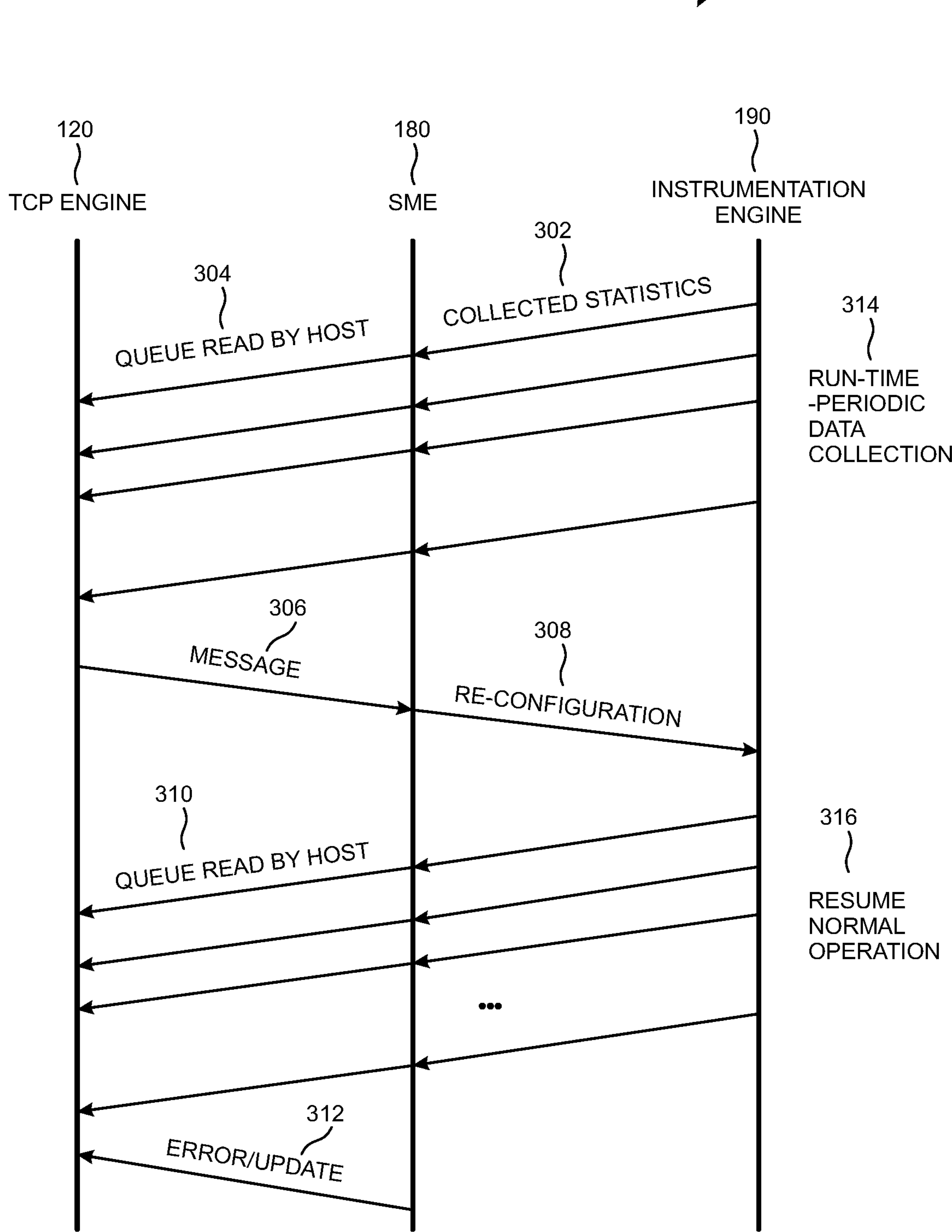
FIG. 3 is an illustration showing a messaging sequence between a TCP engine, an SME, and an instrumentation engine in IPs, according to an exemplary embodiment.

In an embodiment, the statistics management entity (SME) (180) may execute operations or functions to manage the functions or operations for collecting or assimilating statistical information or data. Further, the SME 180 may execute functions or operations of exchanging information or data with the host device power-up ON. Further, the SME 180 may execute operations related to managing and allocating TLV values for the collected statistics. Further, the SME 180 may execute operations or functions related to hardware programming and execute operations associated with handling runtime actions, for example, INIT, error, or re-configuration based on a command from the TCP engine 120. Further, the SME 180 may execute operations or functions to provide scripting, or user-driven instantiates to capture processes in an instrumentation engine 190 (as shown in FIG. 3). The SME 180 may execute operations to work in cooperation with the data-driven module (e.g., AI/ML engine or the like) to derive insights for optimizing the setting up of computing resources based on various attributes or parameters. For example, such attributes or parameters may include time of the day, traffic patterns, quality of service (QOS), etc.

In an embodiment, the instrumentation engine 190 may be deployed in different modules of the accelerator device 150. For instance, such modules may execute operations or functions to collect the telemetry information and send it to the DMA engine 170. In an embodiment, based on the application and specific implementations of the application, the instrumentation engine 190 may be defined or configured accordingly. In other words, the instrumentation engine 190 is implementation-specific.

In an embodiment, the telemetry data may be collected, for example, in the free format or the TLV format. For instance, the free format of the telemetry data may include telemetry statistics that are not organized in any specific packet format. The telemetry data may be collected in the free format when the vendor ID is implicit, as the accelerator device (150) is recognized by the host device 502. In an embodiment, different types of statistics may be collected and segregated by mapping different streams into a corresponding queue. Each data packet may have a fixed length, so identifying packet boundaries is easier.

In an embodiment, the telemetry data may be collected in the TLV format. For instance, the TLV format may capture critical information related to data packet statistics. Such provision of the TLV format may enable the data packet statistics to be self-contained. In an embodiment, the consuming entity on the host device 502 may identify the source vendor and statistics type by containing the Queue ID and the type values. The length value may enable identifying the boundary of the data packet. Further, the TLV format of telemetry data may enable the inclusion of additional data fields that may be optional and have functional significance.

In an embodiment, the TLV format of the telemetry data may include multiple fields. Some fields, for example, may be classified as mandatory fields and optional fields. For instance, the mandatory fields may include a Type field: The Type field identifies the kind of statistics present in the packet, and a Length field, the Length of the packet, enables identifying the packet boundary. Some optional fields may be present after the mandatory fields based on the type of statistics collected. The presence of these fields may be specific to each kind of telemetry statistic and the "Type" value. For example, such optional fields may include a Stream ID field corresponding to a particular type of statistic that may be collected from multiple points in the processing chain. Further examples may include an IQ sample range that identifies the specific point from which the value was collected. Further, the optional field may include a timestamp field, including a timestamp value (e.g., PTP timestamp) corresponding to the telemetry sample carried in the payload. In an embodiment, the "Value" field may include the actual telemetry statistic information. In an embodiment, specific type fields may be reserved for identifying control packets.

In an embodiment, the server 140 may enable the collection of different types of statistics from different vendors. The server 140 may define mechanisms to manage periodic data. The server 140 may provide flexibility by determining the pattern of statistics consumption and managing intermediate queues. The server 140 may collect different types of statistics from different accelerator devices 150. The server 140 may define the role and responsibilities of the components present in the accelerator device 150 and the server 140. The server 140 may be used to define the packet format to manage statistical data from different vendors and types.

In an embodiment, the server 140 may determine which specific statistic(s) is/are to be enabled. The method described may determine the periodicity of reading the statistics. This may be different for different statistic types. The server 140 may provide flexibility in managing intermediate storage for the collected data.

FIG. 3 is an illustration 300 showing a messaging sequence between the TCP engine (120), the SME (180), and the instrumentation engine 190 in IPs, according to an exemplary embodiment. In an embodiment, the IPs referenced in the subject specification may correspond to a semiconductor intellectual property (SIP) core, IP core, or IP block that is a reusable unit of logic and block of reusable code or functional module. For example, the SIP core may be related to specific operations or functions such as channel estimation, error correction, specific modulation or demodulation techniques, etc. FIG. 3 shows a messaging sequence (e.g., 302-312) among the TCP engine 120), the SME 180, and the instrumentation engine 190 in Ips. In an embodiment, two phases of operations may be enabled. For instance, the first phase may include an initial capability exchange phase after power-up on the host device 502, and the second phase may include a runtime operation phase 314. In an embodiment, the capability exchange phase of operation may include the execution of operations or functions between the host device 502 and the SME 180 immediately after power-up on the host device (502) and may include the following steps.

Step 1: The accelerator device 150 may share an execution capability detail, including certain attributes or parameters, with the host device 502. For example, this may include a list of statistic types supported (as identified by vendor and type); unique vendor and type values would be decided across different vendors so that the applications are portable across deployments; maximum periodicity supported for each Statistic type; maximum number of statistics queues supported; information regarding the amount of memory available in the accelerator device 150 to store the telemetry statistical information (e.g., 216). This influences the periodicity of statistics extraction.

Step 2: The TCP engine 120 may compute the various configuration parameters, including the specific statistics and types for the current setup. This is a subset of the complete list shared by the accelerator device 150 to the host device 502. It allocates TLV values for each statistic type. Such an allocation is specific to each accelerator communicating with the TCP function. This determination will influence the desired number of telemetry statistics queues, measurements, statistics collection periodicity, and the amount of queue RAM available. TCP may determine the mapping of TLVs to queues (e.g., mapping of statistic type of the queue). For example, Statistics Queue 0 is shared between TLV4 and TLV8; Statistics Queue 1 is dedicated to TLV3; Periodicity of statistics collection from each queue.

Step 3: The TCP engine 120 sends the queue configuration to the SME 180 of the accelerator device 150. The SME 180 accepts that information and executes hardware programming actions. In an embodiment, the run-time statistics collection may be initiated upon completion of execution of the above-described steps.

As shown in FIG. 3, At S302, the SME 180 collects the statistical information from the instrumentation engine 190. Further, the SME 180 shares the collected statistical information with the TCP engine 120 at 304. The TCP engine 120 also processes the collected statistical data to generate the message. At 306, the TCP engine 120 shares the generated message with the SME 180. At 308, the SME 180 receives the generated message and forwards the generated message to the instrumentation engine 190 to reconfigure the resources (for example).

Similarly, the SME 180 collects the statistical information from the instrumentation engine 190. At 310, the SME 180 shares the collected statistical data with the TCP engine 120. At 312, the SME 180 shares the error or update information to the TCP engine 120. In an embodiment, runtime periodic data collection 314 and resume normal operation 316 steps may be executed as shown in FIG. 3.

Figure 4A:
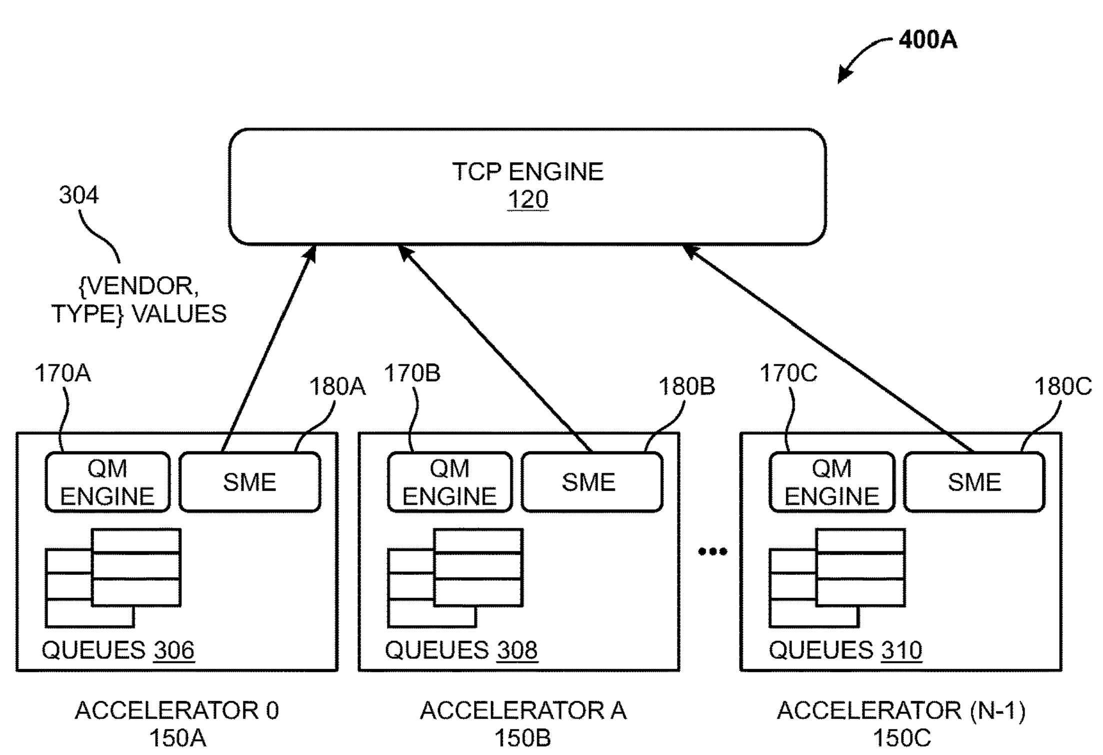
FIG. 4A is a block diagram illustrating accelerator device (s) sharing statistical information with the TCP engine, according to an exemplary embodiment.

FIG. 4A is a block diagram 400A illustrating the accelerator devices (150*a*-150*n*) sharing statistical information with the TCP engine 120, according to an exemplary embodiment. With reference to FIG. 4A, there is shown a mechanism for a capability exchange process at a system level. In an embodiment, FIG. 4A shows the accelerator device (e.g., accelerator 0, accelerator 1, accelerator (n−1)) sharing capability and identification information (306, 308, 310) and vendor type 304 with the TCP engine 120.

Figure 4B:
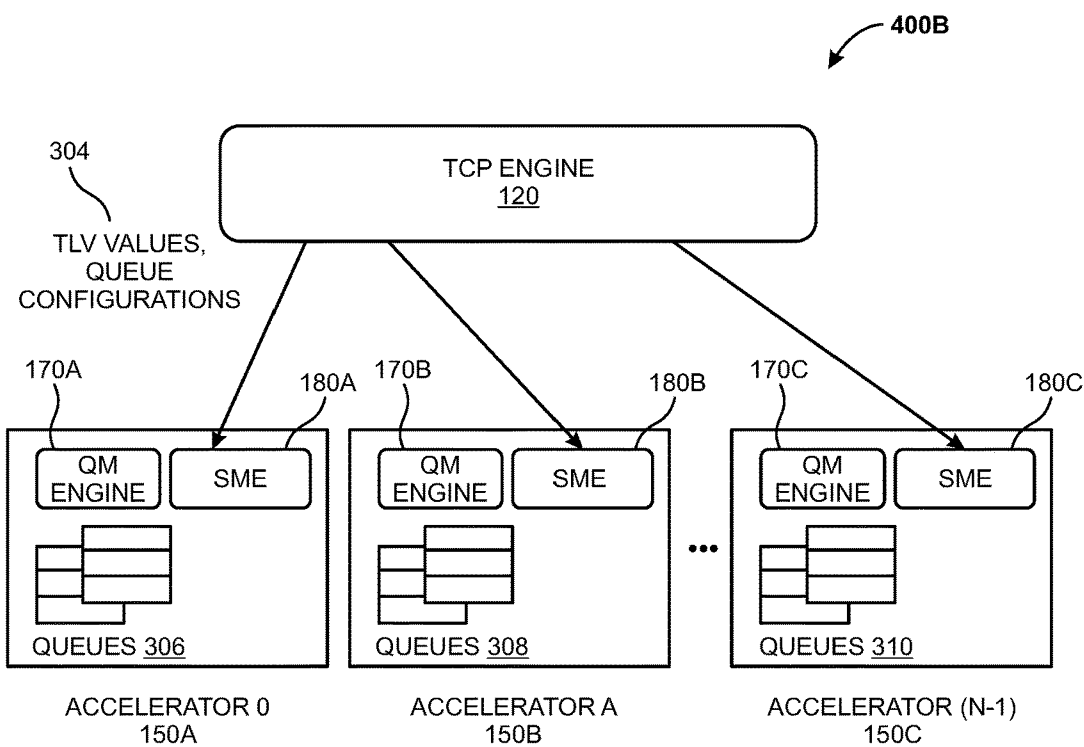
FIG. 4B is a block diagram illustrating the TCP engine executing statistical decisions based on the statistical data received from the accelerator device(s), according to an exemplary embodiment.

FIG. 4B is a block diagram 400B illustrating the TCP engine 120 executing statistical decisions based on the statistical data received from the accelerator device (150*a*-150*n*), according to an exemplary embodiment. With reference to FIG. 4B, there is shown the TCP engine 120 executing statistical decisions (316, 318, 320) based on statistical information (306, 308, 310) collected from the accelerator device (e.g., accelerator 0, accelerator 1, accelerator (n−1)).

In an embodiment, the statistical information may correspond to re-configuration or error indications that may be exchanged between the host device 502 and the accelerator device 150 (e.g., ASIC/FPGA device) at runtime. For instance, the statistical information may also include special messages. In an embodiment, the re-configuration may correspond to re-configuring the queues, the hardware functions, etc. The error messages may correspond to error indications that may be needed in both directions. The Queue_flush message may correspond to flush a specific queue. The Init message may correspond to the re-initializing of the statistics collection mechanism that may be initiated by the host device 502. The effect would be like a reset, but this operation may be initiated at runtime. An essential requirement is that this operation should not affect any other function of the accelerator device 150.

FIG. 5 is a block diagram 500 illustrating an implementation of different queue categories, according to an exemplary embodiment. With reference to FIG. 5, there is shown an implementation of different queue categories (e.g., 504-510). The different queue categories may include statistics queues 504 that may enable measuring information collected from the internal logic. They are flexibly configurable as described with reference to FIG. 3. Further, control queues (e.g., 506) may include, for example, one from the accelerator device 150 (e.g., ASIC/FPGA to the host device 502, and the other one from the host device 502 to the accelerator device 150. They enable conveying error as well as configuration messages. Further, optional queues (e.g., 508) may be used to implement system-specific functions or operations. The most important function is a timekeeping function. In an embodiment, the timekeeping function may enable synchronization. For instance, most statistics are periodic and may be collected accordingly. The accelerator device 150 produces statistical information, while the host device 502 is the consumer.

In an embodiment, the system design needs to synchronize the statistics generation and consumption rates. This is ensured when the producer and consumer are synchronized to a standard or common timing reference, such as a PTP timestamp. In an embodiment, the timekeeping function helps to provide a periodic tick that decides the pace of statistics gathering by the host device 502. In cases where the host device 502 does not have periodicity support, it is proposed that the accelerator device 150 may transmit or send periodic timekeeping messages through an optional timekeeping queue. Detection of this message may instantiate some actions by the host device 502 to generate read operations from the statistics queues (e.g., 510) or other actions. This queue needs to be a dedicated queue to ensure a low-latency and low-jitter path to the host device 502.

In an embodiment, the above-described RAN telemetry framework may enable accommodating multiple vendors and statistic types. For example, formats for vendor and device portability may include using {Vendor, Type} combination during capability exchange, where {Vendor, Type} values are standardized across vendors and products and allocated by agreement between vendors. Further, the RAN telemetry framework enables the use of TLV statistics during the transferring actual statistical information. Additionally, the RAN telemetry framework provides some flexibility so that the telemetry collection function may configure queues, etc., that may enable the collection and management of different statistic types with various periodicity and data sizes. Further, the RAN telemetry framework may provide a flexible queue configuration approach to manage different types of statistics. It is a mechanism to manage the statistics collection process's periodicity control even when the host device (502) does not support it.

In an embodiment, the RAN telemetry framework may provide the adoption of common interfaces and features by various vendors. The acceleration products may provide an ecosystem including a wide variety of applications that may be developed by third parties to optimize different usage metrics. Once protocols and packet formats are agreed upon, moving a large part of the functions to specialized hardware may be possible. The overhead of additional power consumption because of the statistics-gathering operation may be optimized or minimized.

Figure 6:
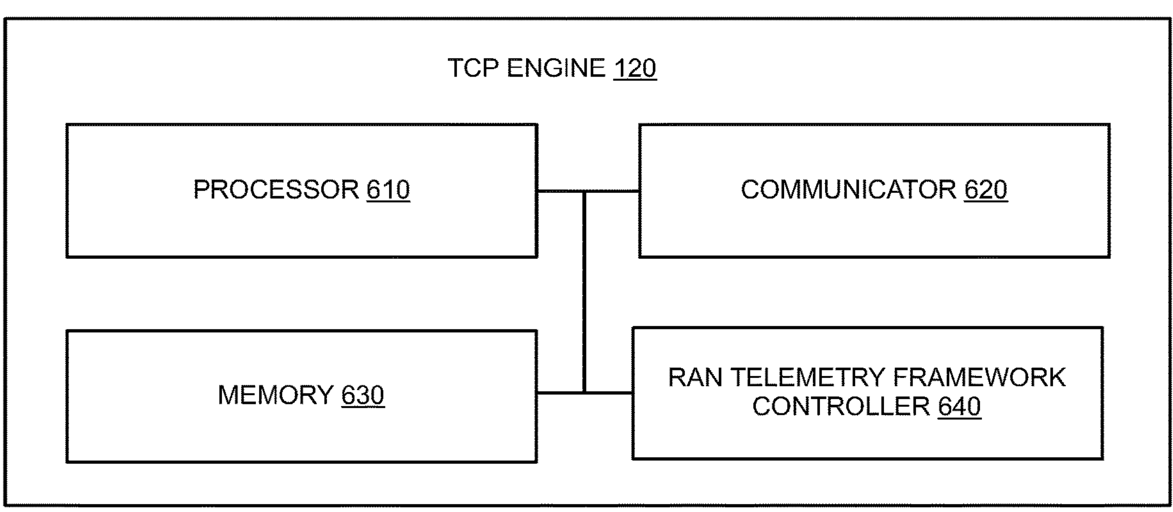
FIG. 6 shows various hardware components of the TCP engine, according to an exemplary embodiment.

FIG. 6 shows various hardware components of the TCP engine 120 according to an exemplary embodiment. The TCP engine 120 is deployed on the CPU core 130 of the server (140). In an embodiment, the TCP engine 120 includes a processor 610, a communicator 620, a memory 630, and a RAN telemetry framework controller 640. The processor 610 is coupled with the communicator 620, the memory 630, and the RAN telemetry framework controller 640.

The RAN telemetry framework controller 640 establishes the communication between the TCP engine (120) and the accelerator device 150 from the plurality of accelerator devices (150*a*-150*n*) through an interface (e.g., PCIe interface or the like). Upon establishing the communication, the RAN telemetry framework controller 640 receives a message from the accelerator device 150. The message includes the telemetry statistical information. In an embodiment, the telemetry statistical information includes the capability and identification information, the reconfiguration message exchanged between the host device 502 and the accelerator device 150 at runtime, the error message exchanged between the host device 502 and the accelerator device 150 at runtime, and the reconfiguration message indicating reconfiguring queues and a hardware function.

Based on the received message, the RAN telemetry framework controller 640 executes one or more operation(s). The one or more operation(s) may be, for example, but not limited to, configuring the computing resource on the accelerator device 150, reconfiguring the computing resource on the accelerator device 150, periodically assimilating statistical information, and the telemetry operation. The telemetry operation referred to may include monitoring some measurements typically done in, for example, the 5G network. The measurement may be, for example, an SS-RSRP, a CSI-RSRP, an SS-RSRQ, a CSI-RSRQ, an SS-SINR, and a CSI-SINR. The computing resource corresponds to one or more of the: allocating a TLV value for each statistic type, a required number of telemetry statistics queues, a desired measurement, statistics collection periodicity, and the amount of queue memory available and mapping of the TLV to the queue. The desired measurement is related to, for example, an SS-RSRP, a CSI-RSRP, an SS-RSRQ, a CSI-RSRQ, an SS-SINR, and a CSI-SINR. Further, the RAN telemetry framework controller 640 shares the operation with the accelerator device 150.

The RAN telemetry framework controller 640 may be implemented by analog and/or digital circuits such as logic gates, integrated circuits, microprocessors, microcontrollers, memory circuits, passive electronic components, active electronic components, optical components, hardwired circuits, and the like, and may optionally be driven by firmware.

The processor 610 may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and an AI-dedicated processor such as a neural processing unit (NPU). The processor 610 may include multiple cores and is configured to execute the instructions stored in the memory 630.

Further, the processor 610 is configured to execute instructions stored in the memory 630 and to execute various processes. The communicator 620 is configured to communicate internally between internal hardware components and external devices via one or more networks. The memory 630 also stores instructions to be executed by the processor 610. The memory 630 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 630 may, in some examples, be considered a non-transitory storage medium. The term "non-transitory" may indicate that the storage medium is not embodied in a carrier wave or a propagated signal. However, the term "non-transitory" should not be interpreted that the memory 630 is non-movable. In specific examples, a non-transitory storage medium may store data that may, over time, change (e.g., in Random Access Memory (RAM) or cache).

Although FIG. 6 shows various hardware components of the TCP engine 120, it is to be understood that other embodiments are not limited thereon. In other embodiments, the TCP engine 120 may include fewer or more components. Further, the labels or names of the components are used only for illustrative purposes and do not limit the scope of the invention. One or more components may be combined to execute the same or substantially similar function in the TCP engine 120.

Figure 7:
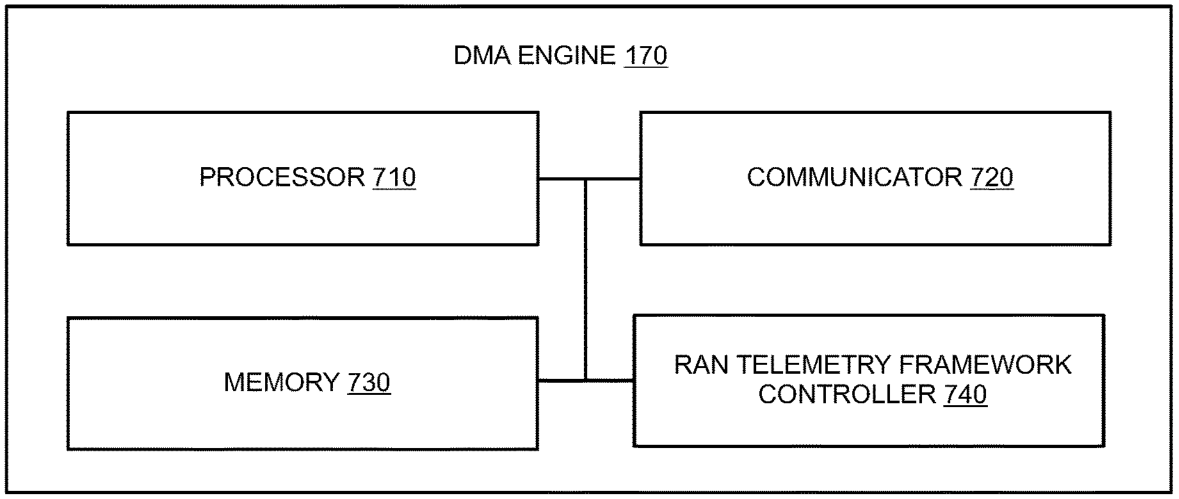
FIG. 7 shows various hardware components of a DMA engine, according to an exemplary embodiment.

FIG. 7 shows various hardware components of the DMA engine 170, according to an exemplary embodiment. In an embodiment, the DMA engine 170 includes a processor 710, a communicator 720, a memory 730, and a RAN telemetry framework controller 740. The processor 710 is coupled with the communicator 720, the memory 730, and the RAN telemetry framework controller 740.

The RAN telemetry framework controller 740 establishes the communication between the DMA engine 170 and the TCP engine 120 through the interface. Upon establishing the communication, the RAN telemetry framework controller 740 receives the message from the TCP engine 120 to execute one or more of: manage the plurality of circular queues and assimilate telemetry statistical information on the accelerator device 150. The plurality of circular queues stores telemetry statistical information in the specified format. The specified format includes one or more of the free and TLV formats. In an embodiment, the telemetry statistical information is collected in the free format when the vendor ID is implicit, as the host device recognizes one or more accelerator devices 150 (502). The different types of telemetry statistical information are collected and segregated by mapping different streams to a corresponding queue managed by the DMA engine 170.

In another embodiment, the TLV format captures critical information related to the telemetry statistical information. The TLV format includes the type of field, the length field, the stream ID field, the timestamp field, and the value field. The type of field identifies a type of telemetry statistical information present in a data packet. The length field indicates the length of the data packet and a packet boundary. The stream ID field corresponds to a specific statistic type collected from multiple points in a network processing chain. The timestamp field indicates the telemetry sample carried in the payload, and the value field indicates actual telemetry statistic information.

The RAN telemetry framework controller 740 may be implemented by analog and/or digital circuits such as logic gates, integrated circuits, microprocessors, microcontrollers, memory circuits, passive electronic components, active electronic components, optical components, hard-wired circuits, and the like, and may optionally be driven by firmware.

The processor 710 may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor such as a neural processing unit (NPU). The processor 710 may include multiple cores and is configured to execute the instructions stored in the memory 730.

Further, the processor 710 is configured to execute instructions stored in the memory 730 and to execute various processes. The communicator 720 is configured to communicate internally between internal hardware components and external devices via one or more networks. The memory 730 also stores instructions to be executed by the processor 710. The memory 730 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 730 may, in some examples, be considered a non-transitory storage medium. The term “non-transitory” may indicate that the storage medium is not embodied in a carrier wave or a propagated signal. However, the term “non-transitory” should not be interpreted that the memory 730 is non-movable. In specific examples, a non-transitory storage medium may store data that may, over time, change (e.g., in Random Access Memory (RAM) or cache).

FIG. 7 shows various hardware components of the DMA engine 170. In other embodiments, the DMA engine 170 may include fewer or more components. Further, the labels or names of the components are used only for illustrative purposes and do not limit the scope of the invention. One or more components may be combined to execute the same or substantially similar function in the DMA engine 170.

Figure 8:
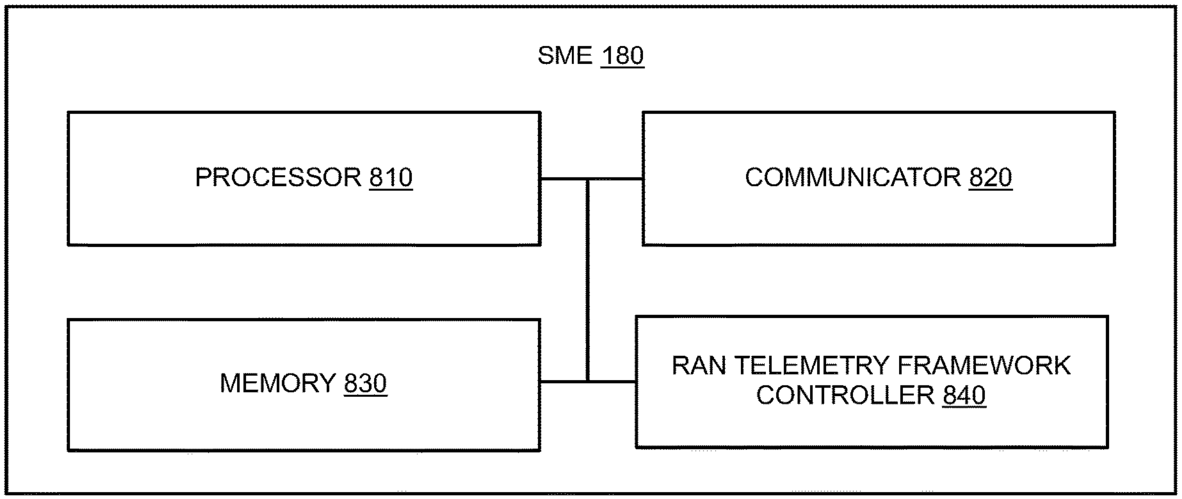
FIG. 8 shows various hardware components of the SME, according to an exemplary embodiment.

FIG. 8 shows various hardware components of the SME 180, according to an exemplary embodiment. In an embodiment, the SME 180 includes a processor 810, a communicator 820, a memory 830, and a RAN telemetry framework controller 840. The processor 810 is coupled with the communicator 820, the memory 830, and the RAN telemetry framework controller 840.

The RAN telemetry framework controller 840 establishes the communication between the SME 180 and the TCP engine 120 through the interface. Upon establishing the communication, the RAN telemetry framework controller 840 receives the message from the TCP engine 120. Based on the received message, the RAN telemetry framework controller 840 instantiates the operation(s). The operation(s) may be, for example, but not limited to collecting statistical information, assimilating statistical information, exchanging the statistical information with the host device 502 while the host device 502 powers ON, managing and allocating the TLV value for the collected statistical information, executing operations related to a runtime action, a user-driven instantiation for collecting the telemetry information in an instrumentation engine 190, and operating with a data-driven module (e.g., machine learning module, artificial intelligence module or the like) for optimizing a setting up of the one or more computing resource based on one or more parameter. The runtime action includes re-initializing the statistics collection mechanism that is initiated by the host device 502, a reconfiguration message exchanged between the host device 502 and one or more accelerator device 150 at runtime, an error message exchanged between the host device 502 and the one or more accelerator device 150 at runtime, wherein one or more parameter comprises a time of the day, traffic pattern, and quality of service (QOS). The instrumentation engine 190 sends the telemetry information to the DMA engine 170.

The RAN telemetry framework controller 840 may be implemented by analog and/or digital circuits such as logic gates, integrated circuits, microprocessors, microcontrollers, memory circuits, passive electronic components, active electronic components, optical components, hard-wired circuits, and the like, and may optionally be driven by firmware.

The processor 810 may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor such as a neural processing unit (NPU). The processor 810 may include multiple cores and is configured to execute the instructions stored in the memory 830.

Further, the processor 810 is configured to execute instructions stored in the memory 830 and to execute various processes. The communicator 820 is configured to communicate internally between internal hardware components and external devices via one or more networks. The memory 830 also stores instructions to be executed by the processor 810. The memory 830 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 830 may, in some examples, be considered a non-transitory storage medium. The term “non-transitory” may indicate that the storage medium is not embodied in a carrier wave or a propagated signal. However, the term “non-transitory” should not be interpreted that the memory 830 is non-movable. In specific examples, a non-transitory storage medium may store data that may, over time, change (e.g., in Random Access Memory (RAM) or cache).

Although FIG. 8 shows various hardware components of the SME 180, it is to be understood that other embodiments are not limited thereon. In other embodiments, the SME 180 may include fewer or more components. Further, the labels or names of the components are used only for illustrative purposes and do not limit the scope of the invention. One or more components may be combined to execute the same or substantially similar function in the SME 180.

FIG. 9 is a flow chart 900 illustrating a method implemented by the TCP engine 120 of the RAN telemetry framework in the mobile network, according to an exemplary embodiment. The operations (902-908) are controlled by the RAN telemetry framework controller 640.

At 902, the method includes establishing the communication between the TCP engine 120 and the accelerator device 150 from the plurality of accelerator devices **150*a*-150*n* through the interface. At 904, the method includes receiving the message from the accelerator device 150. The message includes the telemetry statistical information. At 906, the method comprises executing the operation based on the received message. The one or more operations includes one or more of the: configuring one or more computing resources on one or more accelerator device 150, reconfiguring one or more computing resources on one or more accelerator device 150, periodically assimilating statistical information and telemetry operations. The telemetry operations may include monitoring some measurements typically done in, for example, the 5G network. The measurement can be, for example, but not limited to, an SS-RSRP, a CSI-RSRP, an SS-RSRQ, a CSI-RSRQ, an SS-SINR, and a CSI-SINR. At 908, the method includes sharing, by the TCP engine 120, one or more operations to one or more accelerator devices 150**.

FIG. 10 is a flow chart 1000 illustrating a method implemented by the DMA engine (170) of the RAN telemetry framework in the mobile network, according to an exemplary embodiment. The operations 1002-1004 are controlled by the RAN telemetry framework controller (740).

At 1102, the method includes establishing the communication between the DMA engine 170 and the TCP engine 120 through the interface. At 1104, the method comprises receiving the message from the TCP engine 120 to execute one or more of managing the plurality of circular queues and assimilating telemetry statistical information on one or more accelerator devices 150. The plurality of circular queues stores telemetry statistical information in a specified format.

FIG. 11 is a flow chart 1100 illustrating a method implemented by the SME 180 of the RAN telemetry framework in the mobile network 200, according to an exemplary embodiment. The operations 1102-1106 are handled by the RAN telemetry framework controller (840).

At 1102, the method includes establishing the communication between the SME 180 and the TCP engine 120 through the interface. The TCP engine 120 is deployed on the CPU core 130 associated with the server 140. At 1104, the method includes receiving the message from the TCP engine 120. At 1106, the method instantiates the one or operation(s) based on the received message. The one or more operation(s) includes one or more of: collecting statistical information, assimilating statistical information, exchanging the statistical information with the host device 502 while the host device 502 powers ON, managing and allocating a TLV value for the collected statistical information, executing operations related to a runtime action, a user-driven instantiation to collect the telemetry information in the instrumentation engine (190), and operating with a data-driven module for optimizing a setting up of the one or more computing resource based on one or more parameter.

Based on the method described, the RAN telemetry framework assists in one or more of the: managing different types of telemetry statistical information, managing periodicity of a collection process of the telemetry statistical information, and periodicity control of the telemetry statistical information. The method described may enable different types of statistics from different vendors. The method described may be used to define mechanisms to manage periodic data. The method described may provide flexibility to the server 140 in determining the pattern of statistics consumption and managing intermediate queues.

The method described may collect different types of statistics from different accelerator devices 150. The method described may define functions or operations that may be executed by the components in the server 140 and the accelerator device 150. The method described may be used to define the packet format to manage statistical data from different vendors and types. The method described may handle the periodic data. The method described may determine which specific statistic(s) is/are to be enabled. The method described may determine the periodicity of reading the statistics. This may be different for different statistic types. The method described may provide flexibility in managing intermediate storage for the collected data.

Based on the method described, the RAN telemetry framework enables the adoption of standard interfaces and features, thereby accommodating multiple vendors and statistic types. The RAN telemetry framework enables the use of TLV statistics type during the transfer of actual statistical information. The RAN telemetry framework provides flexibility so that the telemetry collection function may configure queues, etc., that may enable the collection and management of different statistic types with various periodicity and data sizes. Further, the RAN telemetry framework may provide a flexible queue configuration approach to manage different kinds of statistics, a mechanism to manage the periodicity of the statistics collection process, and periodicity control.

Figure 12:
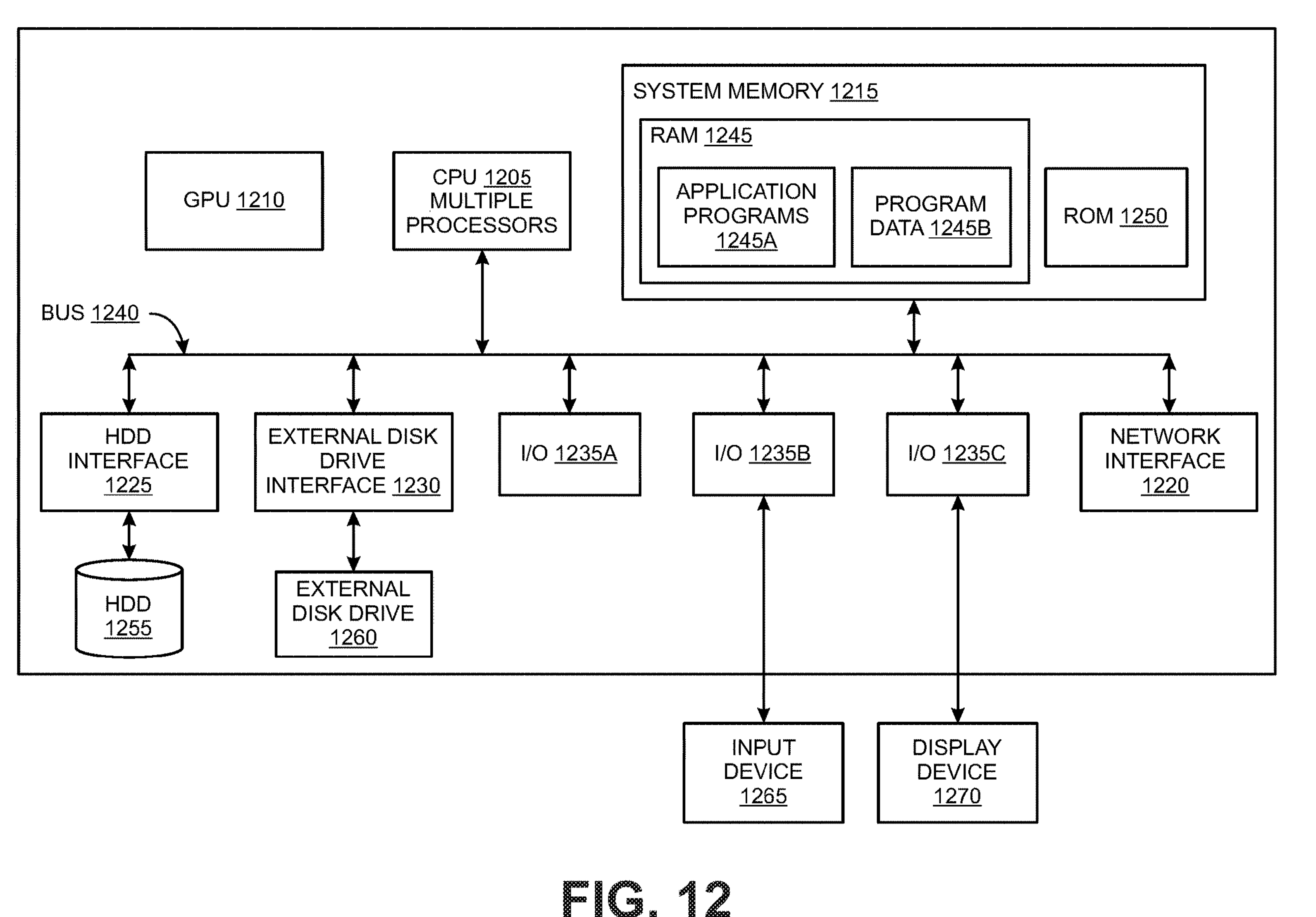
FIG. 12 shows an exemplary hardware configuration of a computer system that may be used to implement functions and operations of the RAN telemetry framework, according to an exemplary embodiment.

FIG. 12 shows an exemplary hardware configuration of a computer system 1200 that may implement functions and operations of the RAN telemetry framework, according to an exemplary embodiment. The computer system 1200 includes a CPU 1205, a GPU 1210, a system memory (1215), a network interface 1220, a hard disk drive (HDD) interface 1225, an external disk drive interface 1230 and input/output (I/O) interfaces 1235A, 1235B, 1235C. These elements of the computer are coupled to each other via the system bus 1240. The CPU 1205 may execute arithmetic, logic, and/or control operations by accessing the system memory 1215. The CPU 1205 may implement the processors of the exemplary devices and/or systems described above. The GPU 1210 may execute operations for processing graphics or AI tasks. In case a computer system 1200 is used for implementing an exemplary central processing device, the GPU 1210 may be the GPU 1210 of the exemplary central processing device as described above. The computer system 1200 does not necessarily include the GPU 1210; for example, a computer 1200 is used for implementing a device other than a central processing device. The system memory 1215 may store information and/or instruct the CPU 1205. The system memory 1215 may include volatile and non-volatile memory, such as random-access memory (RAM) 1245 and read-only (ROM) 1250. A basic input/output system (BIOS) containing the basic routines that help transfer information between elements within the computer 1200, such as during start-up, may be stored in ROM 1250. The system bus 1240 may be any of several types of bus structures, including a memory bus or memory controller, a peripheral bus, and a local bus using various architectures.

The computer may include a network interface 1220 for communicating with other computers and/or devices via a network. Further, the computer may include a hard disk drive (HDD) 1255 for reading from and writing to a hard disk (not shown) and an external disk drive (1260) for reading from or writing to a removable disk (not shown). The removable disk may be a magnetic disk for a magnetic disk drive or an optical disk such as a CD-ROM for an optical disk drive. The HDD 1255 and external disk drive 1260 are connected to the system bus 1240 by the HDD interface 1225 and the external disk drive interface 1230, respectively. The drives and their associated non-transitory computer-readable media provide non-volatile storage of computer-readable instructions, data structures, programs, modules, and other data for the general-purpose computer. The computer-readable instructions may correspond to the mechanism of collecting different types of statistical data and dynamically determining network conditions.

Although the exemplary environment described herein employs a hard disk (not shown) and an external disk (not shown), it should be appreciated by those skilled in the art that other types of computer-readable media may store data that is accessible by a computer, such as magnetic cassettes, flash memory cards, digital video disks, random access memories, read-only, and the like, may also be used in the exemplary operating environment.

Several program modules may be stored on the hard disk, external disk, ROM 1250, or RAM 1245, including an operating system (not shown), one or more application programs 1245A, other program modules (not shown), and program data 1245B. The application programs may include at least a part of the functionality as described above.

The computer system 1200 may be connected to the input device 1265, such as a mouse and/or keyboard, and the display device 1270, such as a liquid crystal display, via corresponding I/O interfaces (1235A to 1235C) and the system bus 1240. In addition to an implementation using the computer system 1200, as shown in FIG. 12, a part or all the functionality of the exemplary implementations described herein may be implemented as one or more hardware circuits. Examples of such hardware circuits may include but are not limited to Large Scale Integration (LSI), Reduced Instruction Set Circuits (RISC), Application Specific Integrated Circuit (ASIC), and Field Programmable Gate Array (FPGA).

One or more implementations are now described with reference to the drawings, wherein like reference numerals are used to refer to like elements throughout. In the following description, numerous specific details are set forth to provide a thorough understanding of the various implementations. It is evident, however, that the different implementations may be practiced without these specific details (and without applying to any networked environment or standard).

As used in this application, in some implementations, the terms "component," "system," and the like are intended to refer to, or comprise, a computer-related entity or an entity related to an operational apparatus with one or more specific functionalities, wherein the entity may be either hardware, a combination of hardware and software, software, or software in execution. For example, a component may be, but is not limited to, a process running on a processor, an object, an executable code to an application, a thread of execution, computer-executable instructions, a program, and/or a computer. By way of illustration and not limitation, both an application running on the server (140) and the server may be a component.

The various actions, acts, blocks, steps, or the like in the flow charts (900, 1000, and 1100) may be executed in the order presented, in a different order, or simultaneously. Further, in some embodiments, some actions, acts, blocks, steps, or the like may be omitted, added, modified, skipped, or the like without departing from the scope of the invention.

The above descriptions and illustrations of embodiments, including what is described in the Abstract, are not intended to be exhaustive or to limit one or more embodiments to the precise forms disclosed. While specific embodiments of, and examples for, one or more embodiments are described herein for illustrative purposes, various equivalent modifications are possible within the scope, as those skilled in the relevant art will recognize. These modifications may be made in light of the above-detailed description. Rather, the scope is to be determined by the following claims, which are to be interpreted in accordance with established doctrines of claim construction.

What is claimed is:

1. A method for implementing a radio access network (RAN) telemetry framework in a mobile network, comprising:

providing a telemetry collection and processing (TCP) engine that is configured for:

establishing a communication between the TCP engine and one or more accelerator devices from a plurality of accelerator devices through an interface, wherein the TCP engine is deployed on a central processing unit (CPU) core of a server;

receiving a message from the one or more accelerator devices based on the established communication, wherein the message comprises one or more telemetry statistical information;

executing one or more operations based on the received message, wherein the one or more operations comprises one or more of:

configuring one or more computing resources on the one or more accelerator devices;

reconfiguring one or more computing resources on the one or more accelerator devices;

periodically assimilating statistical information and a telemetry operation; and sharing the one or more operations to the one or more accelerator devices; and a dynamic memory access (DMA) engine, configured for:

establishing a communication between the DMA engine and the TCP engine via the interface; and based on the established communication, receiving a message from the TCP engine to execute one or more of:

managing a plurality of circular queues; and assimilating the telemetry statistical information on the one or more accelerator devices, wherein the plurality of circular queues stores the one or more telemetry statistical information in a specified format, wherein the specified format comprises one of: a free format and a Type-Length-Value (TLV) format, wherein the TLV format captures critical information related to the one or more telemetry statistical information, wherein the TLV format comprises one or more of a type field, a length field, a stream identifier (ID) field, a timestamp field, and a value field, wherein the type field identifies a type of the one or more telemetry statistical information present in a data packet, wherein the length field indicates a length of the data packet and a packet boundary, wherein the stream ID field corresponds to a specific statistic type collected from multiple points in a network processing chain, wherein the timestamp field indicates a telemetry sample carried in a payload, and wherein the value field indicates an actual telemetry statistic information.

2. The method of claim 1, wherein the one or more telemetry statistical information comprises one or more of:

a capability and identification information;

a reconfiguration message exchanged between a host device and the one or more accelerator devices at runtime;

an error message exchanged between the host device and the one or more accelerator devices at the runtime; and a reconfiguration message indicating a re-configuration of queues and a hardware function, wherein the one or more telemetry statistical information is collected in a free format, when a vendor identifier (ID) is implicit as the host device recognizes the one or more accelerator devices, and wherein different types of the one or more telemetry statistical information is collected and segregated by mapping different streams to a corresponding queue managed by a dynamic memory access (DMA) engine included in the one or more accelerator devices.

3. The method of claim 1, wherein the one or more computing resource corresponds to one or more of:

an allocated Type-Length-Value (TLV) value for each statistic type associated with the one or more telemetry statistical information;

a required number of telemetry statistics queues, a desired measurement, statistics collection periodicity, and an amount of queue memory available and mapping of the TLV to the queue.

4. The method of claim 1, wherein the one or more accelerator devices comprises one or more of: a dynamic memory access (DMA) engine and a statistics management entity (SME), wherein the one or more accelerator devices provide the one or more telemetry statistical information.

5. The method of claim 1, wherein when a host device does not have a periodicity support, the one or more accelerator device sends a plurality of periodic timekeeping messages through a timekeeping queue to the TCP engine.

6. The method of claim 1, wherein the one or more accelerator devices share an execution capability detail comprising one or more parameter with a host device, wherein the one or more parameter comprises a list of statistic types supported by the one or more accelerator devices, a type of vendor, a maximum periodicity supported for each statistic type associated with the one or more telemetry statistical information, the maximum number of statistics queues supported at the one or more accelerator devices, information regarding an amount of a memory available in the one or more accelerator device to store the one or more telemetry statistical information.

7. The method of claim 1, wherein the RAN telemetry framework executes operations for one or more of:

managing different types of the one or more telemetry statistical information;

managing periodicity of a collection process of the one or more telemetry statistical information; and periodically controlling a transmission of the one or more telemetry statistical information.

8. The method of claim 1, further comprising:

a statistics management entity (SME) configured, configured for:

establishing a communication between the SME and the TCP engine through the interface;

receiving a message from the TCP engine based on the established communication; and instantiating one or more operations based on the received message, wherein the one or more operation comprises one or more of:

collecting the one or more telemetry statistical information;

assimilating the telemetry statistical information;

exchange the one or more telemetry statistical information with a host device while the host device powers ON;

managing and allocating a TLV value for the one or more collected telemetry statistical information;

executing operations related to a runtime action, a user-driven instantiation to collect the one or more telemetry statistical information in an instrumentation engine; and operating with a data-driven module for optimizing a setting up of the one or more computing resource based on one or more parameter, wherein the runtime action comprises one or more of:

re-initializing a statistics collection mechanism that is initiated by the host device;

exchanging a reconfiguration message between the host device and the one or more accelerator device at runtime; and exchanging an error message between the host device and the one or more accelerator device at runtime, wherein one or more parameter comprises a time of the day, traffic pattern, and quality of service (QOS), and wherein the instrumentation engine sends the telemetry information to the DMA engine.

9. A system for implementing a radio access network (RAN) telemetry framework in a mobile network, comprising:

a telemetry collection and processing (TCP) engine, including:

a processor;

a memory; and a RAN telemetry framework controller, coupled with the processor and the memory, configured to:

establish a communication between the TCP engine and one or more accelerator devices from a plurality of accelerator devices through an interface, wherein the TCP engine is deployed on a central processing unit (CPU) core of a server;

receive a message from the one or more accelerator devices based on the established communication, wherein the message comprises one or more telemetry statistical information;

execute one or more operation based on the received message, wherein the one or more operation comprises one or more of:

configuring one or more computing resource on the one or more accelerator device;

reconfiguring one or more computing resource on the one or more accelerator device;

periodically assimilate statistical information and a telemetry operation; and sharing the one or more operations with the one or more accelerator devices; and a dynamic memory access (DMA) engine, including:

a processor;

a memory; and a RAN telemetry framework controller, coupled with the processor and the memory, configured to:

establish a communication between the DMA engine and the TCP engine through the interface, wherein the DMA engine is included in the one or more accelerator devices from the plurality of accelerator devices; and based on the established communication, receive a message from the TCP engine to execute one or more of:

managing a plurality of circular queues; and assimilating the telemetry statistical information on the one or more accelerator devices, wherein the plurality of circular queues stores the one or more telemetry statistical information in a specified format, wherein the specified format comprises one of: a free format and a Type-Length-Value TLV) format, wherein the TLV format captures critical information related to the one or more telemetry statistical information, wherein the TLV format comprises one or more of a type field, a length field, a stream identifier (ID) field, a timestamp field, and a value field, wherein the type field identifies a type of telemetry statistical information present in a data packet, wherein the length field indicates a length of the data packet and a packet boundary, wherein the stream ID field corresponds to a specific statistic type collected from multiple points in a network processing chain, wherein the timestamp field indicates a telemetry sample carried in a payload, and wherein the value field indicates an actual telemetry statistic information.

10. The system of claim 9, wherein the one or more telemetry statistical information comprises one or more of:

a capability and identification information;

a reconfiguration message exchanged between a host device and the one or more accelerator devices at runtime;

an error message exchanged between the host device and the one or more accelerator devices at runtime; and a reconfiguration message indicating a reconfiguration of queues and a hardware function, wherein the one or more telemetry statistical information is collected in a free format when a vendor identifier (ID) is implicit as the one or more accelerator device is recognized by the host device, wherein different types of the one or more telemetry statistical information is collected and segregated by mapping different streams to a corresponding queue managed by a dynamic memory access (DMA) engine included in the one or more accelerator devices.

11. The system of claim 9, wherein the one or more computing resource corresponds to one or more of: allocate a Type-Length-Value (TLV) value for each statistic type associated with the one or more telemetry statistical information, a required number of telemetry statistics queues, a desired measurement, statistics collection periodicity, and an amount of queue memory available and mapping of the TLV to the queue.

12. The system of claim 9, wherein the one or more accelerator devices comprises one or more of: a dynamic memory access (DMA) engine and a statistics management entity (SME), wherein the one or more accelerator device provides the one or more telemetry statistical information when a host device acts as a consumer.

13. The system of claim 9, wherein the one or more accelerator devices sends periodic timekeeping messages through a timekeeping queue to the TCP engine, when a host device does not have a periodicity support.

14. The system of claim 9, wherein the one or more accelerator device shares an execution capability detail comprising one or more parameter with a host device, wherein the one or more parameter comprises a list of statistic types supported by the one or more accelerator device, a type of vendor, a maximum periodicity supported for each statistic type associated with the one or more telemetry statistical information, maximum number of statistics queues supported at the one or more accelerator device, information regarding an amount of a memory available in the one or more accelerator device to store the one or more telemetry statistical information.

15. The system of claim 9, wherein the RAN telemetry framework assists in one or more of: managing different types of the one or more telemetry statistical information, managing periodicity of a collection process of the one or more telemetry statistical information, and periodicity control of the one or more telemetry statistical information.

16. The system of claim 9, further comprising: a statistics management entity (SME), including:

a processor;

a memory; and a RAN telemetry framework controller, coupled with the processor and the memory, configured to:

establish a communication between the SME and the TCP engine through the interface, wherein the SME is included in the one or more accelerator devices from the plurality of accelerator devices;

receive a message from the TCP engine based on the established communication; and instantiate one or more operation based on the received message, wherein the one or more operation comprises one or more of:

collecting the one or more telemetry statistical information;

assimilating the telemetry statistical information;

exchanging the one or more telemetry statistical information with a host device while the host device powers ON;

manage and allocate a TLV value for the one or more collected telemetry statistical information;

executing operations related to a runtime action, a user-driven instantiation to collect the one or more telemetry statistical information in an instrumentation engine; and executing operations with a data-driven module for optimizing a setting up of the one or more computing resource based on one or more parameter, wherein the runtime action comprises one or more of:

re-initializing a statistics collection mechanism that is initiated by a host device;

exchanging reconfiguration messages between the host device and the one or more accelerator device at runtime;

exchanging an error message between the host device and the one or more accelerator device at runtime, wherein one or more parameter comprises a time of the day, traffic pattern, and quality of service (QOS), wherein the instrumentation engine sends the telemetry information to the DMA engine, providing a telemetry collection and processing (TCP) engine that is configured for:

establishing a communication between the TCP engine and one or more accelerator devices from a plurality of accelerator devices through an interface, wherein the TCP engine is deployed on a central processing unit (CPU) core of a server;

receiving a message from the one or more accelerator devices based on the established communication, wherein the message comprises one or more telemetry statistical information;

executing one or more operations based on the received message, wherein the one or more operations comprises one or more of:

configuring one or more computing resources on the one or more accelerator devices;

reconfiguring one or more computing resources on the one or more accelerator devices;

periodically assimilating statistical information and a telemetry operation; and sharing the one or more operations to the one or more accelerator devices.

* * * * *